(12) United States Patent
Carlton et al.

(10) Patent No.: US 8,061,466 B2
(45) Date of Patent: Nov. 22, 2011

(54) WHEEL TRACTOR SCRAPER REAR WHEEL DRIVE ASSIST AND METHOD OF OPERATION

(75) Inventors: Douglas J. Carlton, Peoria, IL (US);
Steven A. Daniel, East Peoria, IL (US);
Daniel P. Sergison, East Peoria, IL (US);
Robert E. Stone, Metamora, IL (US);
Corwin E. Storer, Bartonville, IL (US);
Norval P. Thomson, Dunlap, IL (US);
Todd M. Weier, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 260 days.

(21) Appl. No.: 12/179,186

(22) Filed: Jul. 24, 2008

(65) Prior Publication Data

US 2010/0018727 A1    Jan. 28, 2010

(51) Int. Cl.
*B60K 17/356* (2006.01)
*E02F 9/22* (2006.01)

(52) U.S. Cl. .......... 180/242; 37/305; 172/125; 172/292; 180/306

(58) Field of Classification Search .................. 180/242, 180/305–308; 172/90, 105, 125, 248, 292; 37/305, 463
See application file for complete search history.

(56) References Cited

U.S. PATENT DOCUMENTS

| | | | | |
|---|---|---|---|---|
| 3,206,880 A | * | 9/1965 | Rockwell et al. | 37/414 |
| 3,458,005 A | * | 7/1969 | Malm et al. | 180/243 |
| 3,584,698 A | | 6/1971 | Larson et al. | |
| 3,952,511 A | * | 4/1976 | Turner et al. | 60/430 |
| 3,981,374 A | | 9/1976 | Johns, Jr. | |
| 4,071,106 A | * | 1/1978 | Junck et al. | 180/307 |
| 4,207,691 A | * | 6/1980 | Hyler et al. | 37/413 |
| 4,518,053 A | | 5/1985 | Queveau | |
| 4,635,743 A | | 1/1987 | Riehl | |
| 4,896,442 A | * | 1/1990 | Stiff et al. | 37/355 |
| 5,682,958 A | | 11/1997 | Kalhorn et al. | |
| 6,039,133 A | * | 3/2000 | Zulu | 180/6.64 |
| 6,267,163 B1 | * | 7/2001 | Holmes | 144/336 |
| 6,857,494 B2 | | 2/2005 | Kobayashi et al. | |
| 2010/0018728 A1 | | 1/2010 | Bright et al. | |

OTHER PUBLICATIONS

Office Action mailed Sep. 16, 2010 in U.S. Appl. No. 12/179,267.
Displacement Change, Poclain Hydraulics, Poclain Hydraulics Training Center, available at http://www.poclain-hydraulics.com/portals/0/self%20training/Changement%20de%20cylindree_GB.pdf.

* cited by examiner

*Primary Examiner* — Anne Marie Boehler
(74) *Attorney, Agent, or Firm* — Michael D. Braunstein

(57) ABSTRACT

A wheel tractor scraper having a rear wheel drive assist, the wheel tractor scraper includes a tractor portion pivotally coupled to a rear scraper portion, the rear scraper portion having a bowl for hauling material and a fluid powered work tool configured to assist in loading the bowl, the work tool powered by a fluid pump connected to a fluid operated work tool motor. The rear wheel drive assist includes a fluid operated drive motor coupled to the rear wheels of the machine, a diverter valve having a first position at which fluid flow is delivered from the pump to the work tool motor and a second position at which fluid flow is delivered from the pump to the drive motor, and a controller being configured to control the diverter valve to engage the rear wheel drive assist. The machine may be operated by engaging the pump and work tool motor, and then actuating the diverter valve to the second position to divert flow from the work tool motor to the drive motor.

5 Claims, 8 Drawing Sheets

WHEEL TRACTOR SCRAPER REAR WHEEL DRIVE ASSIST AND METHOD OF OPERATION

TECHNICAL FIELD

This disclosure relates generally to the art of earth moving equipment and particularly to a fluid operated rear wheel drive assist for a wheel tractor scraper.

BACKGROUND

The wheel tractor scraper is a machine employed in various industries, such as agriculture, construction and mining to load, haul, eject and spread layers of earth. Such machines are particularly suited for applications, for example, in roadway construction and site preparation, where material needs to be removed or added while creating or maintaining grade and hauling occurs over moderate distances, e.g. under one mile. Conventional wheel tractor scrapers typically include a tractor portion having a forward frame member that supports the operator station and a power source operatively coupled to the driven wheels of the machine. An articulated joint couples the tractor portion to the rear scraper portion, the scraper portion having a rear frame member that supports both a bowl for collecting and hauling material, and the rear wheels. During operation, the bowl is typically lowered to engage the ground along a cutting edge that is driven forward by the machine, loading the bowl. Many of these machines will have an earthmoving work tool, such as an elevator, conveyor, auger, or spade, associated with the bowl to facilitate penetration and/or loading of the material to be transported.

One of the limiting factors associated with wheel tractor scraper operations are the traction conditions of the work site. Tractor scraper operations can be limited, for example, by the type of material, geographic location, and seasonal conditions of the work site.

Various improvements and methods of operation have been adopted by the industry to increase the versatility and efficiency of these machines. For example, wheel tractor scrapers are often employed in push-pull operations, wherein a first tractor scraper is either pulled or pushed by a second machine, for example, a track-type dozer or another wheel tractor scraper, during the loading process. Wheel tractor scrapers are often provided with hitches or push bars to facilitate these operations. However, the option of a second machine is not always possible, and this increases operating costs. Further, this does not address concerns of the tractor scraper becoming stuck during the remainder of the work cycle.

As an alternative, some large wheel tractor scrapers are provided with an additional, rear mounted engine operatively connected to drive the rear wheels of the machine (twin-engine scrapers), making these machines better suited for handling adverse terrain and worksite conditions. However, another alternative has been to provide a fluid operated rear wheel assist.

For example, U.S. Pat. No. 5,682,958 to Kalhorn et al. provides a hydrostatic rear wheel assist that includes a reversible variable displacement pump operatively coupled to an engine and mounted to the front frame section of an articulated scraper. The pump is fluidly connected to a pair of motors positioned on the rear frame section for driving the right and left rear wheels, respectively. The pump may be actuated via a floor pedal that controls an engagement/disengagement valve having two positions, an engagement position for directing pressurized fluid to the motors, and a disengagement position for preventing flow to the motors. However, this requires an additional and dedicated fluid pump, fluid lines, and other components that significantly add to overall vehicle complexity and cost.

In general, the need exists in the industry for wheel tractor scrapers that are capable of efficient operation under a greater range of terrain conditions. In particular, the need exists for an improved rear wheel assist design and efficient methods of operation thereof.

SUMMARY OF THE INVENTION

In one aspect, the present disclosure provides a wheel tractor scraper having a tractor portion that includes a power source drivingly connected to at least one front wheel of the scraper, and a scraper portion pivotally connected to the tractor portion, the scraper portion having the bowl and at least one rear wheel. A work tool is also connected to the rear scraper portion and configured to load the bowl, the work tool being powered by a work tool pump that is fluidly connected to a fluid operated work tool motor. The rear wheel drive assist includes at least one fluidly operated drive motor operatively connected to the at least one rear wheel and a diverter valve that includes at least a first position at which fluid flow is delivered from the work tool pump to the work tool motor and a second position at which fluid flow is diverted from the work tool pump to the at least one fluid operated drive motor. A controller is provided to deliver a diverter control signal to move the diverter valve between the first position and the second position to engage the rear wheel drive assist.

In another aspect, provided is a wheel tractor scraper having a tractor portion that includes a power source drivingly connected to at least one front wheel of the scraper, and a scraper portion pivotally connected to the tractor portion, the scraper portion having the bowl, and first and second rear wheels disposed on opposite sides thereof. A work tool is also connected to the rear scraper portion and configured to load the bowl, the work tool being powered by a work tool pump that is fluidly connected to a fluid operated work tool motor. A hydraulic rear wheel drive assist is provided that includes a first hydraulic drive motor operatively connected to the first rear wheel, a second hydraulic drive motor operatively connected to the second rear wheel, and a diverter valve selectively movable between a first position at which fluid flow is delivered from the work tool pump to the work tool motor and a second position at which fluid flow is diverted from the work tool pump to the first and second drive motors. A controller is provided to deliver a diverter control signal to move the diverter valve between the first position and the second position to engage the rear wheel drive assist, and is also configured to determine a front wheel speed and a rear wheel speed, and to modify the rear wheel speed to match the front wheel speed.

In yet another aspect, provided is a method of operating a wheel tractor scraper that includes engaging a hydraulically driven work tool to assist in loading material into a scraper bowl, and engaging a rear wheel assist by delivering a diverter control signal to a diverter valve to responsively divert a flow of hydraulic fluid powering the work tool to at least one drive motor operatively connected to at least one rear wheel of the wheel tractor scraper.

These and other aspects and advantages of the present disclosure will become apparent to those skilled in the art upon reading the following detailed description in connection with the drawings and appended claims.

DETAILED DESCRIPTION

Figure 1:
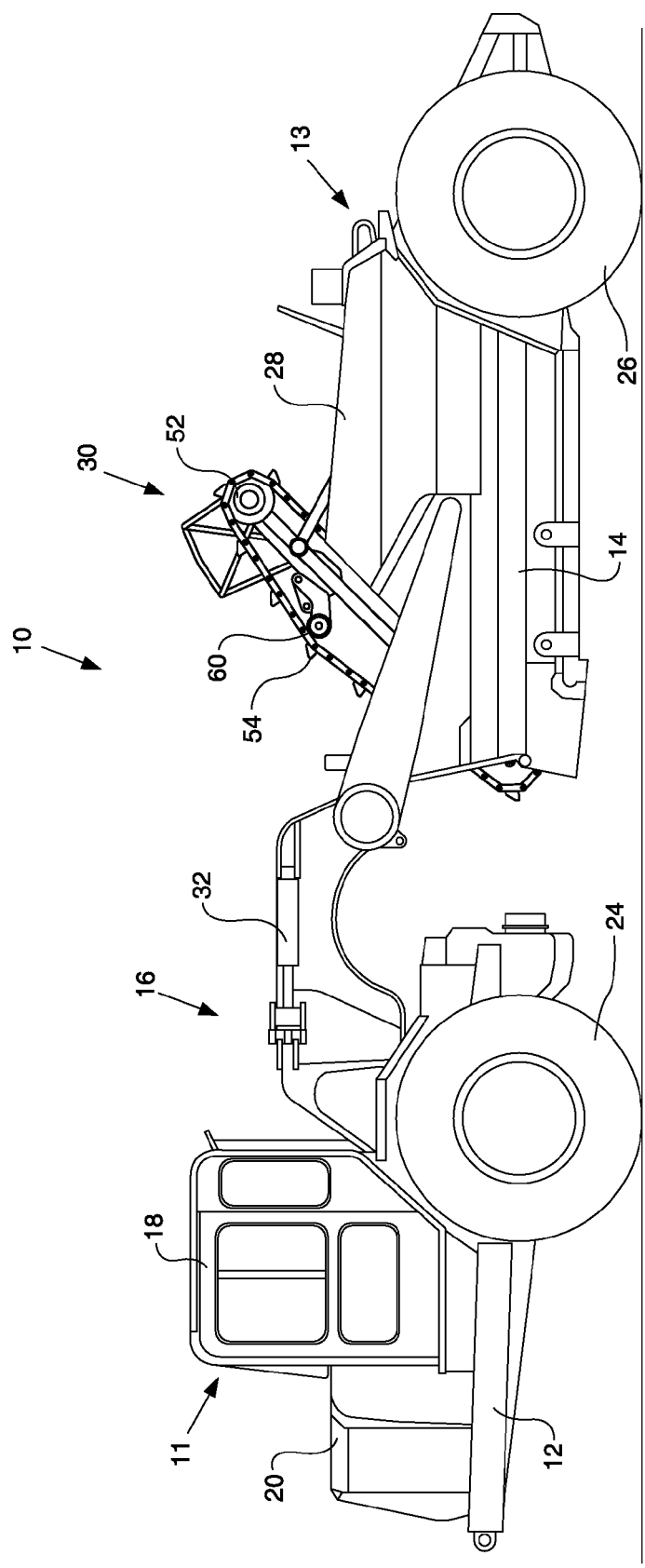
FIG. 1 is a diagrammatic illustration of an exemplary wheel tractor scraper.

FIG. 1 illustrates an elevating wheel tractor scraper 10 having a tractor portion 11, with a front frame section 12, and a scraper portion 13, with a rear frame section 14, that are pivotally coupled through articulation hitch 16. Steering may be provided by steering cylinders 32 (one shown) mounted between the tractor portion 11 and scraper portion 13 on opposing sides of the machine. The front frame section 12 supports a cooling system (not shown) and power source 20, the power source 20 operatively connected through a transmission 22 (FIG. 2) to drive front wheels 24 for primary propulsion of the scraper 10. The front frame section 12 may also support an operator station 18 for primary control of the scraper 10 during ordinary operations.

The rear frame section 14 may support the bowl 28 and rear wheels 26. The bowl 28 may also include a fluid powered work tool 30, such as an elevator 52 (shown), auger, conveyor, or spade, to facilitate penetration and/or loading of the material to be transported.

Power source 20 may include an engine such as, for example, a diesel engine, a gasoline engine, a gaseous fuel powered engine such as a natural gas engine, or any other type of engine apparent to one of skill in the art. Power source 20 may alternatively include a non-combustion source of power such as a fuel cell, a power storage device, an electric motor, or other similar mechanism.

Figure 2:
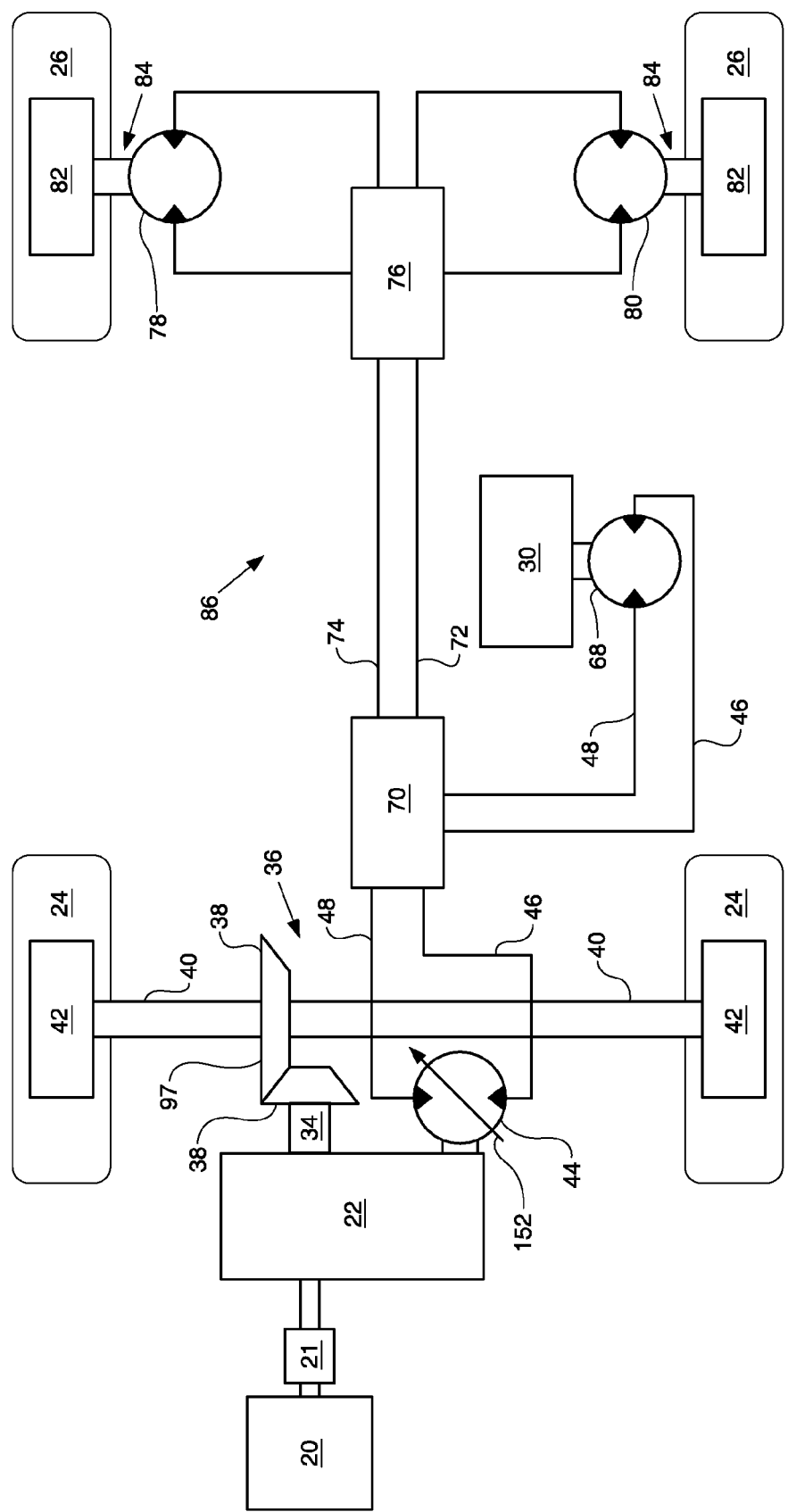
FIG. 2 is a diagrammatic representation of a power train and rear wheel assist system in accordance with one embodiment of the present disclosure.

As shown in FIG. 2, power source 20 may be operatively connected to front wheels 24 through a conventional transmission 22. The transmission 22 may be configured to transmit power from power source 20 to an output shaft 34 at a range of output speed ratios. Transmission 22 may be a hydraulic transmission, mechanical transmission, a hydro-mechanical transmission, an electric transmission, or any other suitable transmission known in the art. Alternatively, transmission 22 may transmit power from power source 20 at only a single output speed ratio. Transmission 22 may be connected to the power source 20 via a torque converter 21, gear box, or in any other manner known in the art. Transmission 22 may include an output shaft 34 operatively coupled through a transfer case or differential 36 having one or more gears 38 to transmit power through an axle shaft 40 to driven wheels 24 located on the left and right side of the scraper 10. Scraper 10 may also include a final drive reduction gear arrangement 42 associated with the axle shaft 40.

In an alternative embodiment (not shown), scraper 10 may include an electric or hydraulic drive (not shown). For example, power source 20 may be operatively connected to a pump, such as a variable or fixed displacement hydraulic pump. The pump may produce a stream of pressurized fluid directed to one or more motors associated with front wheels 24 for the primary means of propulsion. Alternatively, power source 20 may be drivably connected to an alternator or generator configured to produce an electrical current used to power one or more electric motors for driving the front wheels 24.

In addition to driving the front wheels 24, power source 20 may be configured to supply power to a work tool 30 employed by the scraper to penetrate and/or transfer material into bowl 28. In one embodiment, shown in FIG. 2, the transmission 22 is connected to a pump 44, which may be a variable displacement, variable delivery, fixed displacement, or any other pump configuration known in the art. While depicted as connected through the transmission 22, pump 44 may be connected to the power source 20 directly, to the torque converter 21, or at any desirable location along the powertrain. Pump 44 is fluidly connected through one or more supply and/or return lines 46,48 to supply a flow of pressurized fluid to hydraulic motor 68 operatively connected to power work tool 30. Throughout the specification, use of the terms supply and return in the alternative, or shown as "supply/return" should be understood to refer to the fact that the system may include a reversible pump that may be employed to change the direction of flow within particular conduits, in one direction acting as a supply, and in the other acting as a return line.

Figure 5:
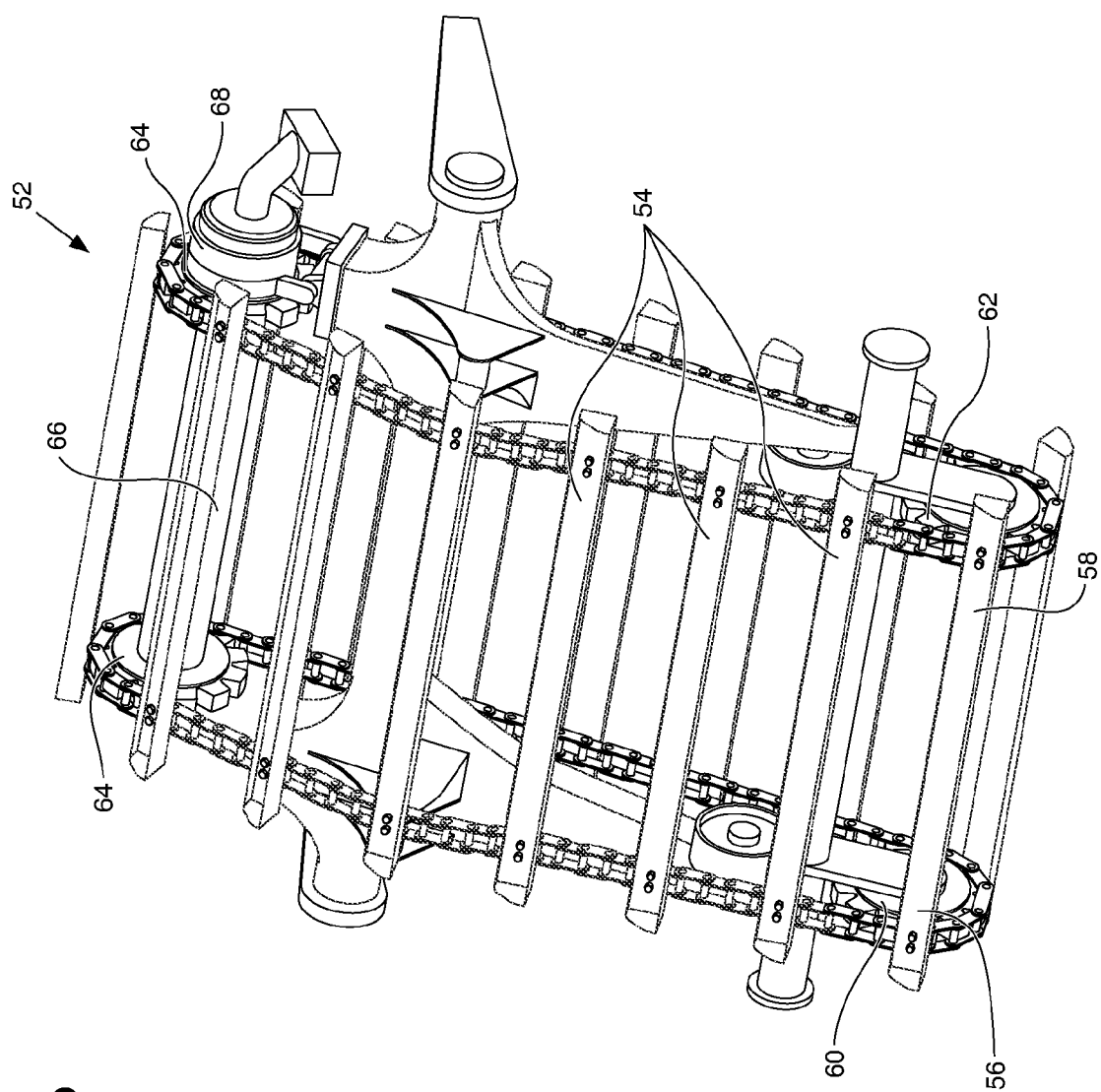
FIG. 5 is an illustration of an exemplary elevator.

In one embodiment, work tool 30 is an elevator 52 such as that depicted in FIG. 5. The elevator 52 generally includes a series of parallel, horizontally disposed flights 54, each flight 54 having a first end 56 and second end 58 connected to a first 60 and second 62 drive chain, respectively. The drive chains 60,62 are operatively connected to rotational sprockets 64 connected to elevator drive shaft 66 and elevator motor 68.

In certain operating conditions where, for example, mud, ice or snow, cause the primary driven wheels 26 of the scraper 10 to lose traction and/or the machine becomes stuck, the scraper 10 may be provided with a fluid operated rear wheel drive assist 86 that may be engaged manually or automatically. Referring to FIG. 2, the rear wheel drive assist 86 generally includes a diverter valve 70 disposed along the supply/return lines 46,48 between the pump 44 and work tool motor 68 to divert the flow of pressurized fluid to first and second supply/return lines 72,74. Supply/return lines 72,74 are fluidly connected to a flow divider 76 to direct flow between right and left drive motors 78,80. As with the front wheels 24, a final drive reduction 82 may be provided between the motors 78,80 and the rear wheels 26. Clutches 84 may be configured for selective engagement between the motors 78,80 and the final drives 82.

Figure 3:
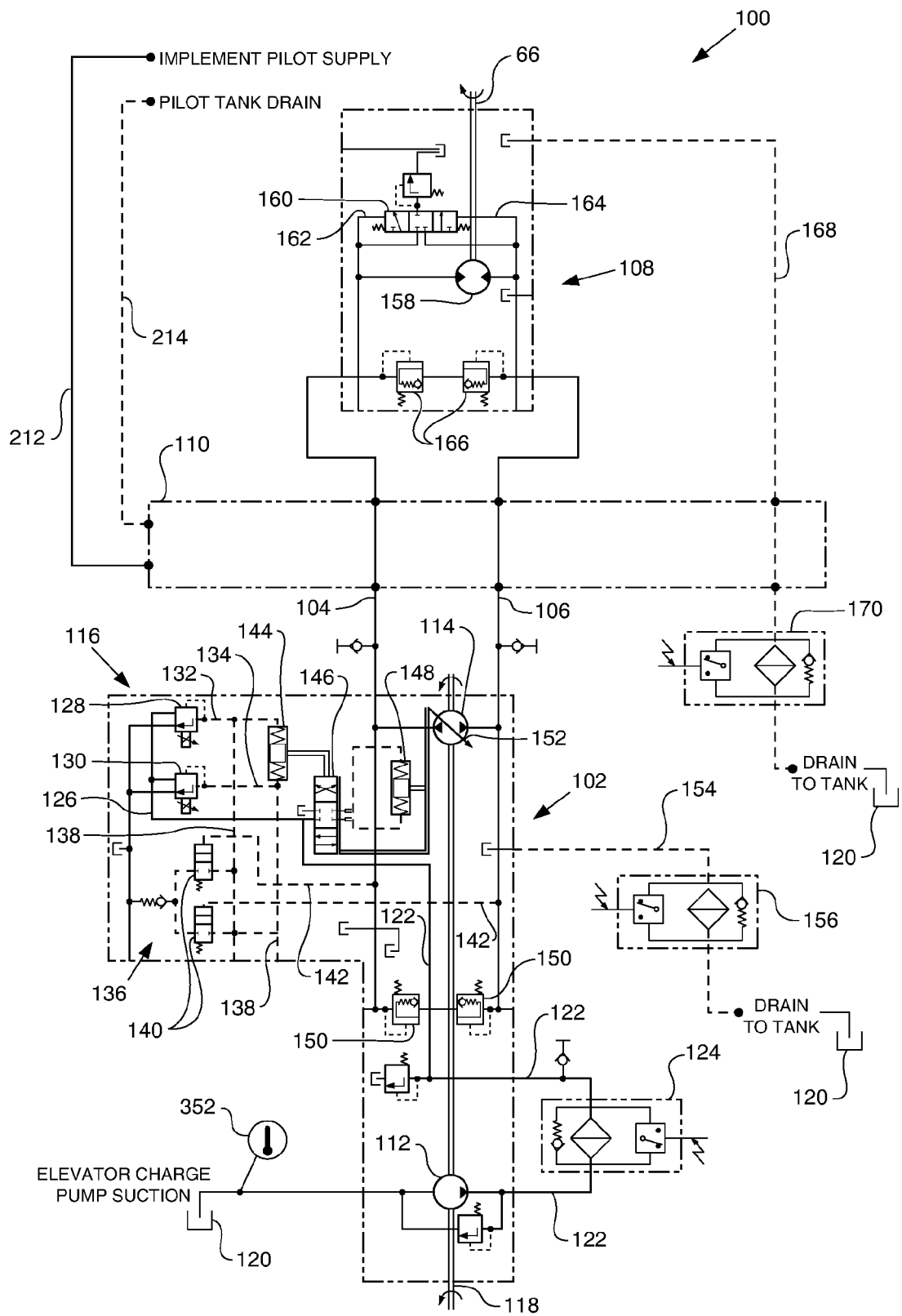
FIG. 3 is a schematic of an exemplary fluid operated system in accordance with one embodiment of the present disclosure.

FIG. 3 demonstrates one embodiment of an elevator and rear wheel drive assist closed-loop hydraulic system 100. The hydraulic system 100 generally includes the main elevator pump assembly 102 fluidly connected through forward supply/return line 106 and reverse supply/return line 104 to elevator motor assembly 108. Disposed along lines 104/106 between the elevator pump assembly 102 and elevator motor assembly 108 is the rear wheel assist assembly 110, shown in detail in FIG. 4.

The Pump Assembly 102 generally includes a charge pump 112, main pump 114, filters 124, 156, and a main pump control group 116, the charge pump 112 and main pump 114 being driven by shaft 118 operatively connected to the power source 20. Charge pump 112 is fluidly connected to fluid reservoir 120 to deliver a flow of pressurized fluid through charge line 122 and in-line charge filter 124 to control line 126. Disposed along control line 126 are forward and reverse solenoid control valves 128,130 that open to provide fluid flow along actuator control lines 132,134, respectively.

Actuator control lines 132,134 can be pressurized to control movement of swashplate spool actuator 144, which is mechanically linked to control the position of the three-way swash plate control spool 146. Swash plate control spool 146 is both mechanically linked to main swash plate actuator 148 and provides pressure from control line 126 to further provide movement of main actuator 148. Swash plate actuator 148 is mechanically linked to the swash plate 152 of variable displacement pump 114.

The actuator control lines 132, 134 are fluidly connected to max pressure control group 136 through pressure relief lines 138. Pressure relief lines 138 are connected to two-position pressure relief valves 140 that are controlled by pressure transmitted along relief valve control lines 142 connected to forward 106 and reverse 104 supply/return lines, respectively. Cross-over relief valves 150 are also provided to relieve pressure from forward 106 and reverse 104 supply/return lines, further protecting the pump assembly 102 from excessive pressure build-up. A case drain 154 is provided for the pump group 102 that includes a filter 156 fluidly connected to tank 120.

The elevator motor assembly 108 is fluidly connected to the elevator pump assembly 102 through forward and reverse supply/return lines 106,104. Lines 104,106 provide pressurized fluid to drive bi-directional elevator motor 158 that is operatively connected to elevator drive shaft 66 for rotation thereof. A pressure-actuated 3-position flushing valve 160 is fluidly connected to both the supply/return lines 104,106. Flushing valve 160 is controlled via pressure communicated from either of supply/return lines 104,106 via flushing valve control lines 162,164, respectively. Flushing valve 160 (pictured in closed orientation) can be opened to allow fluid from either supply/return lines 104,106 to drain to tank 120. Also provided to relieve pressure within motor assembly 108 are cross-over relief valves 166. Fluid from motor assembly 108 leakage and/or flushing valve 160 may drain to tank 120 via drain line 168 and through filter 170.

Figure 4:
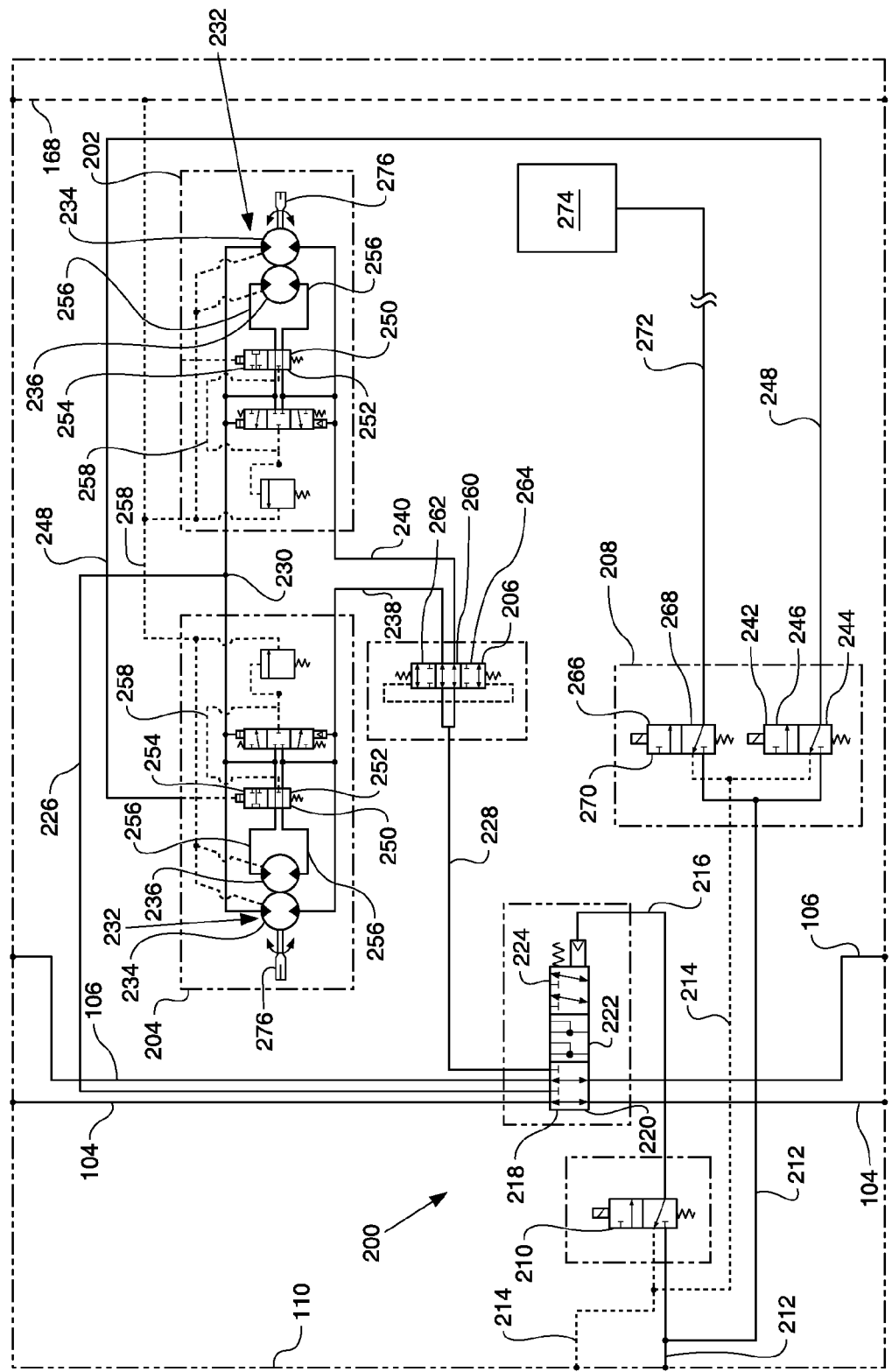
FIG. 4 is an enlarged view of a portion of the fluid operated system of FIG. 3.

FIG. 4 is an enlarged portion of system 100 (FIG. 3), illustrating one embodiment of a rear wheel assist assembly 110. Rear wheel assist assembly 110 generally includes a diverter 200, right drive motor assembly 202, left drive motor assembly 204, limited slip valve 206, and motor control group 208. The diverter 200 includes a two-position solenoid actuated control valve 210 that is connected to a pilot supply line 212 and pilot drain line 214. In the energized position, flow is directed from pilot supply line 212 along diverter valve control line 216 to diverter valve 218. Diverter valve 218 may be a pressure actuated three-way valve that in a first position (shown) 220 allows unrestricted flow through main supply/return lines 104,106 to the elevator motor assembly 108. In a second position 222, flow from pump 102 is divided between both elevator motor assembly 108 and right and left drive motor assemblies 202,204, along motor supply/return lines 226,228. In a third position 224, flow from pump 102 is completely diverted to the drive motor assemblies 202, 204. Second position 222 is a transition position that provides for momentary sharing of flow between the motor assemblies 202,204 and elevator motor assembly 108. Accordingly, diverter valve 218 is ordinarily in either the first 220 or third 224 position. Alternatively, diverter valve 218 may be a two-way valve that includes only first position 220 and third position 224.

Motor supply/return line 226 is split at junction 230 between the right and left motor assemblies 202,204. Motor assemblies 202,204 each include a two-stage radial motor 232 having a first stage 234 and a second stage 236 that correspond to a first and second fixed displacement (not shown). For example, the motor assemblies 202, 204 may include a rotary two stage motor such as the ML series motor by Poclain Hydraulics, France, that include a series of radial pistons that can be moved between a first and second position to modify pump displacement. The motor supply/return line 226 is fluidly connected to directly drive the first stage 234, which is also fluidly connected to supply/return lines 238, 240.

The second stage 236 of the right and left motor assemblies 202,204 is engaged or disengaged via motor control group 208. The motor control group 208 includes a motor speed control valve 242 that is controlled via an electrical signal that may be dependent upon, for example, vehicle speed, transmission output speed and/or a transmission output speed ratio. Upon energizing, the motor speed control valve 242 may move between a first, closed position 244 and a second, open position 246, in which flow is directed from pilot supply line 212, along motor stage control line 248 to actuate second stage control valves 250. As shown, motor speed control valve 242 is normally spring biased in the closed position 244.

As shown, second stage control valves 250 are spring biased in an open configuration (shown), first position 252, that allows pressurized fluid from supply/return lines 226, 238, 240 to flow to motor second stage 236 through second stage control lines 256. The pressurized fluid supplied via control lines 256 moves one or more pistons (not shown) within the rotary pump to increase pump displacement. Primary flow is directed into the pump along supply/return lines 226,238,240. When pressure from control line 248 overcomes the spring bias of valves 250, the valves 250 are moved to a second position 254 that directs the second stage control lines 256 to drain lines 258, causing the pistons to move to a second position and decrease overall pump displacement.

Disposed between supply/return line 228 and supply/return lines 238,240 is a pressure-responsive valve 206 that provides a limited slip function between the left and right motor assemblies 202,204. When one of the rear wheels 26 is slipping, this creates a low pressure condition at the associated motor assembly as there is less resistance and pressure build up associated with the spinning wheel. Pressurized fluid naturally flows to the less resistive, low pressure motor assembly, decreasing power available to the wheel with traction. The limited slip function serves to restrict flow to the motor assembly associated with the slipping wheel, and increase flow to the motor associated with the wheel with traction. More specifically, under equal pressure conditions, valve 206 is spring-biased in a first position 260 (shown) that distributes flow equally to the left and right drive motor assemblies 202,204. If a predetermined pressure differential exists between lines 238 and 240, valve 206 will shift to restrict flow to the lower pressure line.

Figure 8:
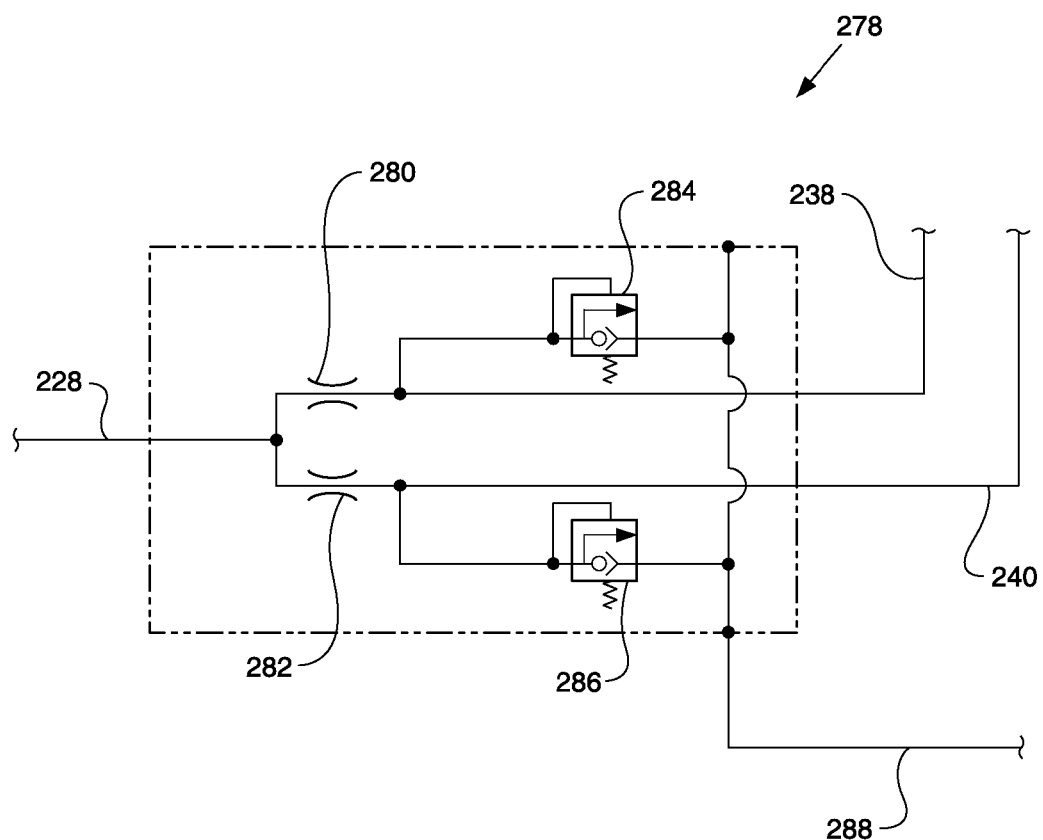
FIG. 8 is an alternative configuration to the limited slip function valve depicted in FIG. 4.

In an alternative embodiment to valve 206, shown in FIG. 8, provided is a flow control arrangement 278. Flow from motor supply/return line 228 is divided and passes through restrictors 280,282 that serve to partially equalize flow to/from supply/return lines 238,240. In the event that one wheel is stuck, creating a high pressure condition associated with one or both of supply/return lines 238,240, spring-actuated pressure relief valves 284,286 can provide a fluid connection to drain line 288 to tank.

In yet another embodiment, motor control group 208 may also include a clutch control valve 266. This solenoid controlled, two-position valve 266 is normally spring biased in a closed, first position 268 that opens clutch control lines 272 to drain line 214. In this position, the clutch assembly 274 is disengaged, allowing the wheels to spin freely relative to motor output shafts 276. When energized to a second position 270, clutch control line 272 may be pressurized to engage clutch assembly 274, connecting output shafts 276 to drive the rear wheels. In another embodiment, a similar valve arrangement (not shown), either alone or in combination with the clutch assembly 274, may be employed to engage a brake assembly associated with, for example, the output shafts 276 or final drives 82.

Figure 6:
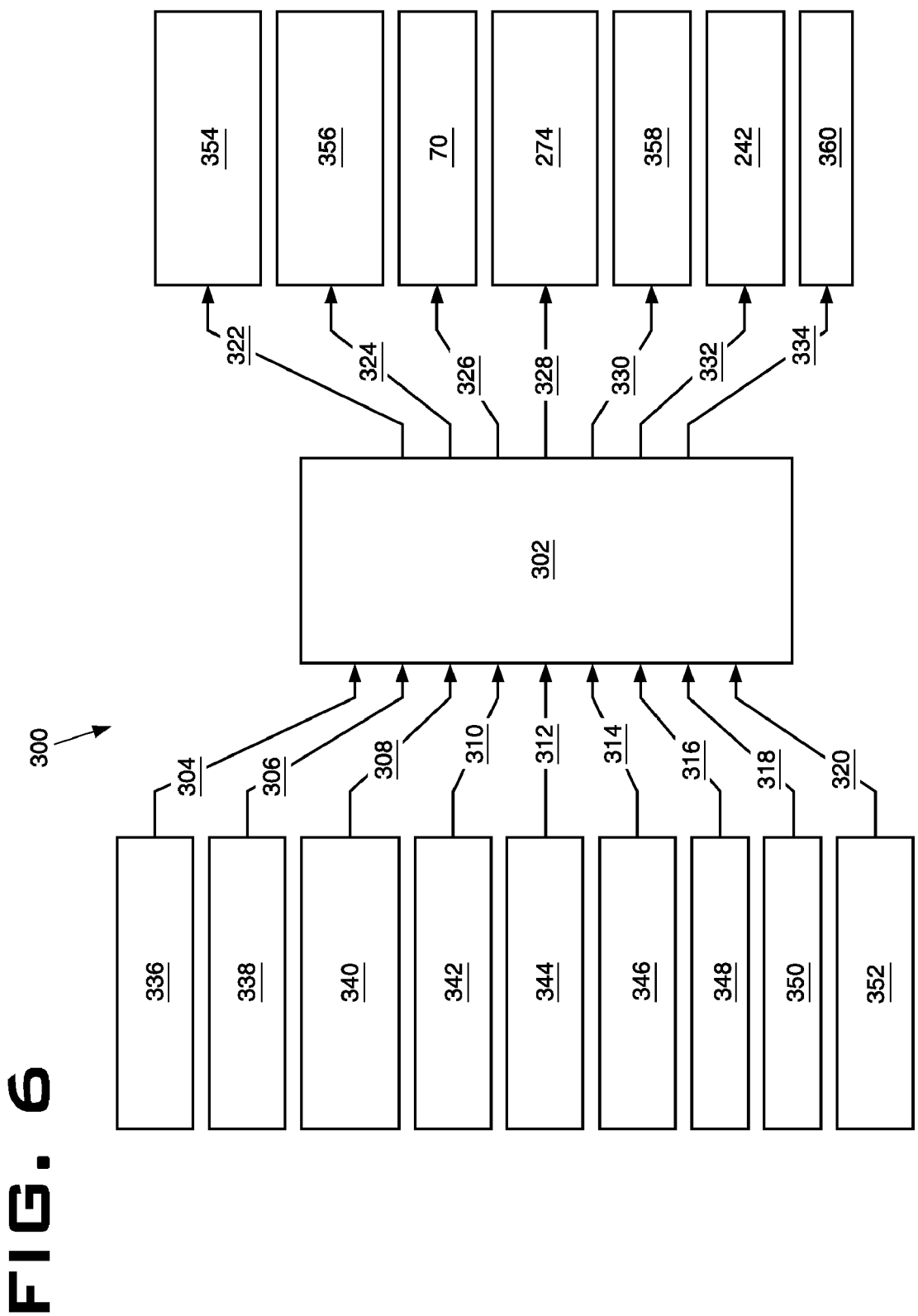
FIG. 6 is a diagrammatic representation of a control system for a rear wheel assist system in accordance with one embodiment of the present disclosure.

FIG. 6 is a diagrammatic representation of a control system 300 in accordance with one embodiment of a rear wheel assist of the present disclosure. Control system 300 generally includes a controller 302 configured to receive various signals 304-320 from operator controls and/or machine sensors, and, based on these inputs, to produce control signals 322-334 for controlling operation of the rear wheel assist system 86. Controller 300 may embody a single microprocessor or multiple microprocessors that include a means for controlling numerous machine functions. Controller 300 may include a memory, a secondary storage device, a processor, and any other components for running an application. Various other circuits may be associated with controller 300, such as power supply circuitry, signal conditioning circuitry, solenoid driver circuitry, and others. Controller 300 may be dedicated to controlling the rear wheel assist system 86, or may be a unit for controlling multiple machine functions.

In particular, controller 302 may be configured to receive a motor speed signal 304,306 from a left and right motor speed sensor 336,338, respectively. Other machine input may include an engine speed signal 310 from an engine speed sensor 342 associated with power source 20; a front transmission condition signal 314 from, for example, a transmission sensor 346 or an operator transmission control mechanism (not shown), and indicative of, for example, a transmission gear ratio; a transmission output speed signal 312 from an output speed sensor 344 associated with, for example, output shaft 34; and/or a hydraulic temperature signal 320 from a hydraulic fluid temperature sensor 352 associated with, for example, the hydraulic pump 44. In addition, input may be received from various operator controls located, for example, in the operator station 18. These may include, for example, a rear wheel assist engagement signal 308 from a rear wheel assist control switch 340; a parking brake signal 316 associated with a parking brake control mechanism 348 indicative of engagement/disengagement of a parking brake (not shown); and/or a service brake signal 318 associated with a service brake control mechanism 350 and indicative of engagement/disengagement of the vehicle service brakes (not shown).

Controller 302 may be configured to control operation of the rear wheel assist system 86 through signals 322-334. These include, for example, forward and reverse pump control signals 322,324 for actuating pump forward and reverse control mechanisms 354,356, such as solenoid control valves 128,130 (FIG. 3), respectively. In addition, a diverter valve control signal 326 may be provided to control diverter valve 70,218, via, for example solenoid control valve 210; a clutch control signal 328 may be provided to control clutch 274 via, for example, solenoid control valve 266; a brake control signal 330 may be provided to control rear wheel or motor brakes 358; and/or a motor speed control signal 332 may be provided to control the speed condition of the left and right drive motor assemblies 202,204 via, for example, solenoid motor speed control valve 242.

Controller 302 may also be configured to communicate the status of the rear wheel assist system 86 to the operator via, for example, a status signal 334 operatively connected to one or more indicators 360, such as an indicator light located in the operator station 18. Alternatively, status signal 334 may be connected to an operator display screen, audible signal indicator, or any other type of indicator known in the art.

INDUSTRIAL APPLICABILITY

The present disclosure provides a wheel tractor scraper 10 that includes a rear wheel assist 86 for improving machine operations in poor traction conditions, thereby increasing machine efficiency and versatility to operate in a greater range of environmental, material and worksite conditions. In particular, provided is a fluid operated rear wheel drive assist 86 that employs a common pump 44 or pumps that are shared with a fluid powered work tool 30, such as an elevator 52, auger, conveyor or spade. When the system is engaged, fluid flow is diverted from the elevator motor 68 to one or more rear wheel drive motors 78,80. The operation of one embodiment of the disclosed rear wheel assist systems is explained in the paragraphs that follow.

Figure 7:
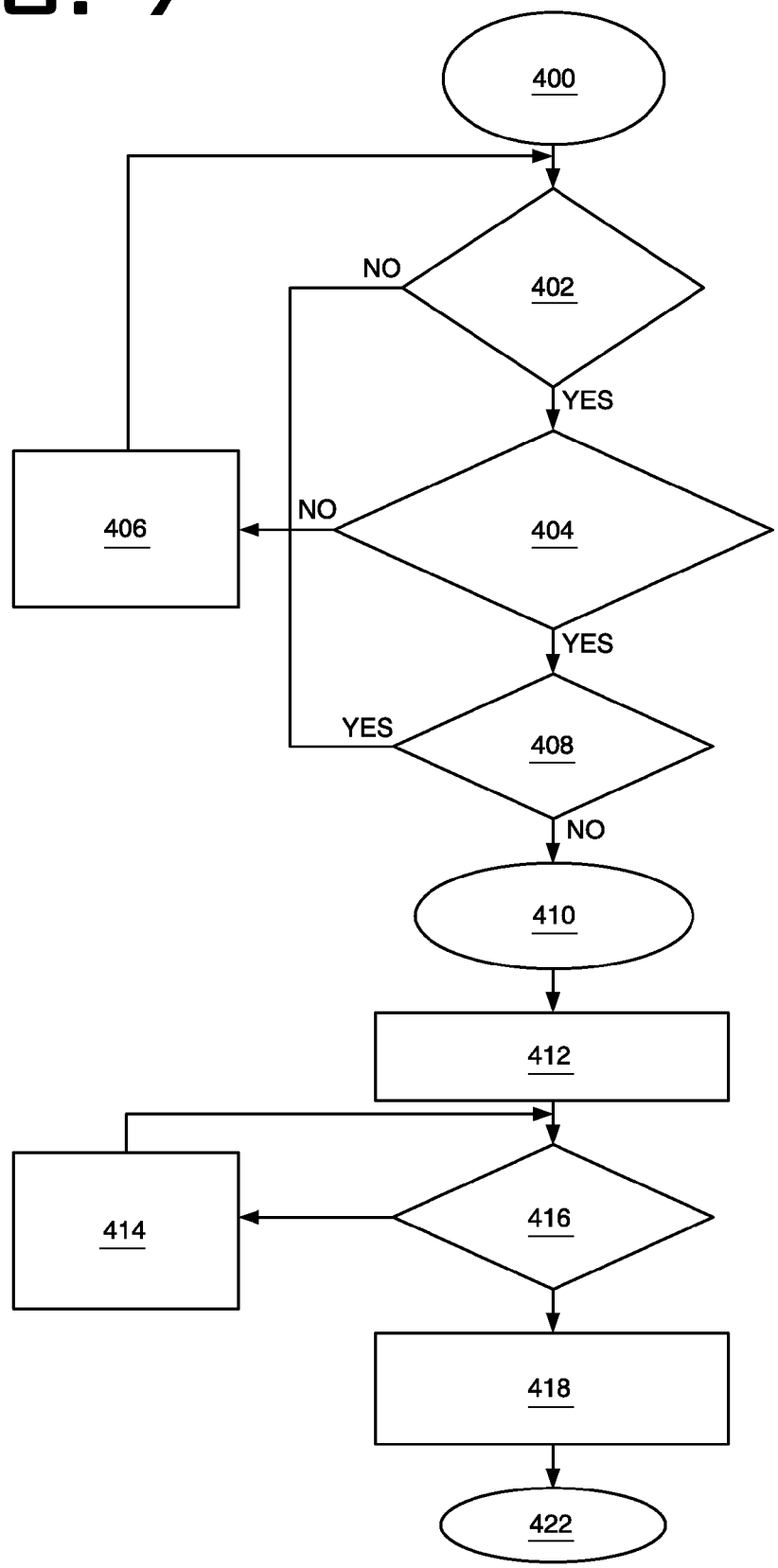
FIG. 7 is a flow chart illustrating a method of operation of a rear wheel assist system in accordance with one embodiment of the present disclosure.

Referring again to FIGS. 3-4, during loading operations, the operator may have engaged elevator pump assembly 102, the charge pump 112 and main pump 114 being powered by rotating drive shaft 118. Charge pump 112 provides a flow of pressurized fluid along charge line 122 to solenoid control valves 128, 130. To actuate the elevator 52, the operator may provide a signal through an operator control (not shown) that controls the magnitude and direction of flow from the variable displacement pump 114. For example, the operator may move the control to energize solenoid control valve 128, providing a flow of pressurized fluid along actuator control line 132, moving swash plate spool actuator 144 and connected main swash plate actuator 148 to control the position of swash plate 152. Activated pump 114 directs a flow of pressurized fluid in a forward direction along forward supply line 106 to elevator motor 158, which drives rotation of elevator drive shaft 66 in a forward direction. In this instance, fluid flow returns from the motor 158 along return line 104 to pump 114. The pump 114 may be operated similarly in a reverse direction via actuation of solenoid control valve 130. From this position, we now refer to the operational flow chart of FIG. 7.

When the operator determines that it is desirable to engage 400 the rear wheel drive assist, the operator may employ the rear wheel assist control switch 340 providing an engagement signal 308 to controller 302. The transmission 22 is capable of operation through a range of gear ratios and vehicle speeds. In one embodiment, the rear wheel assist 86 is designed to operate only at relatively low machine speeds, e.g. below 9 mph. This protects the motors and hydraulic system from overspeed conditions. Moreover, in one embodiment, the purpose of the system is to provide additional traction only when the vehicle becomes disabled due to poor traction conditions, and thus operation may be limited to lower gear ratio, high torque transmission conditions. Accordingly, the controller 302 is provided with a transmission condition signal 314 indicative of, for example, the current transmission gear for performing a transmission status check 402. During status check 402, if the transmission 22 is in the lowest gear ratios, for example, first to third gear, the system 300 proceeds to perform a hydraulic fluid temperature check 404. Otherwise, the rear wheel assist 86 is not engaged (or is disengaged) 406 until the condition is met. In an alternative embodiment, check 402 may be based on the current speed of the machine, as provided, for example, by one or more speed sensors (not shown) associated with the front axle shafts 40, final drives 42 or wheels 24.

The hydraulic fluid temperature check 404 is performed to prevent damage to the hydraulic system components. A temperature signal 320 is provided via one or more temperature sensors 352 associated with, for example, pump assembly 102, to controller 302. If the temperature is above, for example, 90 to 93 degrees Celsius (194 to 199.4 degrees Fahrenheit), the system will not engage (or is disengaged) 406 until the temperature condition is met.

The wheel tractor scraper 10 may include a parking brake, for example, a friction type brake associated with one or more elements of the powertrain, such as the power source 20 or transmission 22 output shafts 34. The controller 302 may be configured to receive a parking brake signal 316 and determine whether the parking brake is engaged or disengaged 408. In the embodiment shown, the rear wheel assist will not engage (or will disengage) 406 if the parking brake is engaged.

Once the controller 302 has determined that the above conditions have been met, the controller 302 will engage the rear wheel assist 410. To engage the rear wheel assist, the controller may provide a diverter valve control signal 326 to diverter valve 70 (FIG. 2) transferring the flow of pressurized fluid from the work tool 30 to rear wheel motors 78,80. More specifically, referring to FIG. 4, diverter valve control signal 326 may be employed to energize solenoid control valve 210, moving the two position valve to direct flow from pilot supply 212 along diverter valve control line 216 to shift diverter valve 218 to third position 224. Thus positioned, pressurized flow is directed from forward supply/return lines 106,104 along motor supply/return lines 226,228 to left and right drive motor assemblies 202,204.

In one embodiment, the rear wheel drive assist 86 may also include a clutch 84,274 configured to mechanically engage or disengage the left and right drive motor assemblies 202,204 from the rear final drives 82 or wheels 26. Controller 302 may provide a clutch control signal 328 to energize solenoid control valve 266, moving from first position 268 to second position 270, thereby creating flow between pilot supply 212 and clutch control line 272 to engage the clutch 274, transferring power from the motor assemblies 202,204 to drive rear wheels 26.

"Disengaged" or "disengaging the system" refers generally to any condition in which power is not supplied to the rear wheels. As described, this may be accomplished by, for example, interrupting pressurized flow to the rear motor assemblies 202,204, or disconnecting the motor assemblies 202,204 from driving the rear wheels 26, alone or in combination. Disengagement may also include shutting down pressurized flow from pump assembly 202.

Also at step 410, the system 300 may signal the operator that the rear wheel assist has been engaged via status signal 334 directed to a rear wheel assist indicator 360, such as an indicator light, display, and/or audible alert. Generally, this will alert the operator when he has employed the control switch 340 that power is not being supplied to drive the rear wheels due to some other operating condition that must be met.

The control system 300 is also configured to control the amount of power supplied to drive the rear wheels 26. This is generally accomplished by controlling operation of the pump assembly 102 and motor assemblies 202,204 in response to various machine and or operator inputs.

More specifically, at step 412 the control system 300 may be configured to modify pump displacement to match the current front transmission output ratio or gear. The controller 302 is configured to receive a transmission condition signal 314 indicative of, for example, the current output ratio or gear selection, and to modify displacement of main pump 114 based thereon. For example, in first to second gear, the main pump 114 may be upstroked to provide a higher flow rate and pressure than in third gear. The controller 302 may be configured to send a pump forward control signal 322 to pump forward control mechanism 354, such as solenoid valve 128 to increase the displacement of pump 114. While shown in FIG. 7 as occurring after engagement of the rear wheel assist 410, matching of pump displacement 412, it should be understood that this process may occur before or after engagement 410.

Typically, the wheel tractor scraper 10 will include service brakes (not shown), such as conventional wet or dry friction brakes, employed to slow or stop the scraper 10 during ordinary operations. Conventional service brakes may be actuated via an operator control, such as a foot pedal, disposed within the operator station 18. When the brakes are employed 416, it may be desirable to disengage 414 the rear wheel assist 86 to reduce the amount of force required to slow the vehicle and to avoid damage to the rear wheel assist 86 components. At step 416, the controller 302 is configured to receive a service brake signal 318 indicative of the status of the service brakes 350, and to thereafter disengage 414 if the service brakes have been engaged. Brake signal 318 may be associated with the degree of movement of a brake pedal (not shown) such that over a first portion of movement thereof, for example, over the first 15 percent of total movement, there is a "deadband" period over which the rear wheel assist 86 remains engaged. When the control pedal moves past 15 percent, the controller 302 is configured to disengage 414 the rear wheel assist 86.

The rear wheel assist control system 300 may also include a closed loop wheel speed control 418 that is generally employed to modify displacement of the main pump 114 to approximately match front 24 and rear 26 wheel speeds (or an average thereof). The purpose of this feature is to provide increased power to drive the rear wheels 26 in the event that the front wheels 24 are slipping, and vice versa.

In one embodiment, the controller 302 is configured to receive a signal indicative of the speed of the front wheels 24. For example, controller 302 may be configured to receive a transmission output speed signal 312 that is employed by the controller 302 to calculate an approximation of the average front wheel speeds 26. The scraper 10 may include a front differential such that the right and left wheel speeds may be independently variable. Accordingly, the transmission output speed signal 312 provides an estimation of average front wheel 24 speeds. Alternatively, sensors (not shown) associated with the front axle shafts, final drives, or wheels may provide a signal indicative of actual front wheel speed. In addition, the power source speed, provided by a power source sensor 342 via signal 310 could also be employed in combination with the transmission output speed signal 312. The front wheel speeds provided to or derived by the controller 302 are employed to control displacement of the pump 44 to control speed of the rear wheel drive motors 78,80 and associated rear wheels 26.

The controller 302 is also configured to receive an indication of rear wheel 26 speeds from right and left motor speed sensors 336,338 via right and left motor speed signals 304, 306. The feedback to the control system 300 is determined by the average of the rear wheel 26 speeds as determined by the controller 302. A speed error signal is determined from the difference between the average front and rear wheel speeds, which is received by a proportional-integral (PI) controller. The PI controller is configured to bring the speed error signal to zero by adjusting the commands to the pump 44 (increasing or decreasing pump displacement accordingly) to attempt to match front and rear wheel speeds.

For example, if the machine is loading, with only the front driven wheels 24 engaged, and the machine becomes stuck, the average front wheel speed could be spinning at, for example, 10 mph, and the rear wheel speed would be zero. The rear wheel assist is engaged, and the pump 44 will stroke up to make the rear motors 78,80 rotate the rear wheels 26 at the same speed as the front wheels 24. Because of efficiency losses and calibration errors associated with the hydrostatic system, transmission output speed signal 312 and/or rear wheel speed determination by the controller, the pump command 322 may not initially match the front and rear wheel speeds. The closed loop speed control will then produce an error and command the pump 44 to increase displacement even higher until the front and rear wheel speeds are approximately equal (speed error equals zero).

Finally, at step 422, once the operator determines that the rear wheel drive assist is no longer necessary, the operator may turn off the rear wheel assist 86 via control switch 340, de-energizing the solenoid control valve 210, which is spring biased to direct flow from control line 216 along pilot drain line 214 to tank. This shifts diverter valve 218 back to first position 220, re-directing flow from pump assembly 102 to the elevator motor assembly 108.

It should be understood that the above description is intended for illustrative purposes only. In particular, it should be appreciated that all methods described herein can be performed in any suitable order unless otherwise indicated herein or otherwise clearly contradicted by context.

While aspects of the present disclosure have been particularly shown and described with reference to the embodiments above, it will be understood by those skilled in the art that various additional embodiments may be contemplated by modification of the disclosed machines, systems and methods without departing from the spirit and scope of what is disclosed. Such embodiments should be understood to fall within the scope of the present invention as determined based upon the claims below and any equivalents thereof.

What is claimed is:

1. A wheel tractor scraper, comprising:
   a tractor portion having a power source drivingly connected to at least one front wheel;
   a scraper portion pivotally connected to the tractor portion, the scraper portion having a bowl, and a first and a second rear wheel disposed on opposite sides of the scraper portion;
   a work tool connected to the scraper portion and configured to load the bowl;
   a work tool pump fluidly connected to a fluid operated work tool motor, the work tool motor operatively connected to power the work tool; and
   a hydraulic rear wheel assist, comprising:
     a first hydraulic drive motor operatively connected to the first rear wheel;
     a second hydraulic drive motor operatively connected the second rear wheel;
     a diverter valve selectively movable between a first position at which fluid flow is delivered from the work tool pump to the work tool motor and a second position at which fluid flow is diverted from the work tool pump to the first and second drive motors, wherein when the diverter valve is in the second position, fluid flow from the work tool pump to the first and second drive motors is prioritized over fluid flow from the work tool pump to the work tool motor; and
   a controller configured to deliver a diverter control signal to move the diverter valve between the first position and the second position, the controller further configured to determine a front wheel speed, to determine a rear wheel speed, and to modify the rear wheel speed to match the front wheel speed.

2. The wheel tractor scraper of claim 1, wherein the controller is configured to receive a first rear wheel speed signal indicative of a first speed of the first rear wheel and a second rear wheel speed signal indicative of a second speed of the second rear wheel, and to average the first speed and second speed to determine the rear wheel speed.

3. The wheel tractor scraper of claim 1, wherein the controller determination of a front wheel speed is based upon receiving at least one of a power source output speed signal, a transmission output speed signal, and an actual front wheel speed signal.

4. The wheel tractor scraper of claim 1, wherein the pump is a variable displacement pump and the first and second drive motors have at least two fixed displacements, the controller being further configured to modify the rear wheel speed by providing a signal to modify at least one of the pump or motor displacements.

5. A wheel tractor scraper, comprising:
   a tractor portion having a power source drivingly connected to at least one front wheel;
   a scraper portion pivotally connected to the tractor portion, the scraper portion having a bowl, and a first and a second rear wheel disposed on opposite sides of the scraper portion;
   a work tool connected to the scraper portion and configured to load the bowl;
   a work tool pump fluidly connected to a fluid operated work tool motor, the work tool motor operatively connected to power the work tool; and
   a hydraulic rear wheel assist, comprising:
     a first hydraulic drive motor operatively connected to the first rear wheel;
     a second hydraulic drive motor operatively connected the second rear wheel;
     a diverter valve selectively movable between a first position at which fluid flow is delivered from the work tool pump to the work tool motor and a second position at which fluid flow is diverted from the work tool pump to the first and second drive motors, wherein when the diverter valve is in the second position, fluid flow is prevented from the work tool pump to the work tool motor; and
   a controller configured to deliver a diverter control signal to move the diverter valve between the first position and the second position, the controller further configured to determine a front wheel speed, to determine a rear wheel speed, and to modify the rear wheel speed to match the front wheel speed.

* * * * *